US010450479B2

(12) United States Patent
Stevenson et al.

(10) Patent No.: US 10,450,479 B2
(45) Date of Patent: Oct. 22, 2019

(54) ADJUSTABLE LOW GLOSS POWDER COATING COMPOSITIONS

(71) Applicant: Stepan Company, Northfield, IL (US)

(72) Inventors: Thomas Stevenson, Columbus, GA (US); James Poole, Coon Rapids, MN (US); Jackie Howell, Ellaville, GA (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 15/727,090

(22) Filed: Oct. 6, 2017

(65) Prior Publication Data

US 2018/0030308 A1 Feb. 1, 2018

Related U.S. Application Data

(63) Continuation of application No. PCT/US2016/026671, filed on Apr. 8, 2016.

(60) Provisional application No. 62/145,686, filed on Apr. 10, 2015.

(51) Int. Cl.
*C09D 167/03* (2006.01)
*C08L 67/00* (2006.01)
*C08G 63/127* (2006.01)
*C09D 5/03* (2006.01)
*C08G 63/02* (2006.01)
*C09D 167/00* (2006.01)
*C09D 167/02* (2006.01)
*C08G 63/91* (2006.01)

(52) U.S. Cl.
CPC ............ *C09D 167/03* (2013.01); *C08G 63/02* (2013.01); *C08G 63/127* (2013.01); *C08G 63/91* (2013.01); *C08L 67/00* (2013.01); *C09D 5/032* (2013.01); *C09D 167/00* (2013.01); *C09D 167/02* (2013.01); *C08G 2150/20* (2013.01)

(58) Field of Classification Search
None
See application file for complete search history.

(56) References Cited

U.S. PATENT DOCUMENTS

| | | | |
|---|---|---|---|
| 6,350,821 B1 * | 2/2002 | Alford | C09D 163/00 428/413 |
| 7,960,482 B2 | 6/2011 | Fugier et al. | |
| 2006/0079650 A1 | 4/2006 | Stevenson et al. | |
| 2010/0120978 A1 * | 5/2010 | Minesso | C08G 63/20 524/602 |
| 2014/0163157 A1 | 6/2014 | Minesso et al. | |
| 2014/0221562 A1 | 8/2014 | Hancill et al. | |

FOREIGN PATENT DOCUMENTS

| | | | | |
|---|---|---|---|---|
| EP | 1 553 148 | | 7/2005 | |
| JP | 2006070082 A | * | 3/2006 | |
| WO | WO 2008/155037 | | 12/2008 | |
| WO | WO-2013017606 A1 | * | 2/2013 | C09D 5/032 |

OTHER PUBLICATIONS

English Machine Translation of JP2006-070082 created Jan. 4, 2019. (Year: 2019).*
International Search Report and Written Opinion, dated Jul. 1, 2016, from International application No. PCT/US16/26671, filed on Apr. 8, 2016.

* cited by examiner

*Primary Examiner* — Christopher M Rodd
(74) *Attorney, Agent, or Firm* — McAndrews, Held & Malloy, Ltd.

(57) ABSTRACT

Thermosetting powdered coating compositions comprising (a) a high Acid Value carboxylic acid functional polyester resin having an Acid Value of at least 100 mg KOH/g and a functionality of at least 4.5, (b) a low Acid Value carboxylic acid functional polyester resin having an Acid Value of 20 to 50 mg KOH/g and a functionality of about 2.5 or less, and (c) a cross-linking agent. The high Acid Value polyester resin is the reaction product of a polycarboxylic acid or its anhydride reacted with a polyester polyol obtained from reacting 0 mol % to 100 mol % of isophthalic acid and/or 0 to 100 mol % terephthalic acid, or a mixture thereof, with a polyol mixture comprising at least one diol and at least one polyol having at least three hydroxyl groups. The thermosetting powdered coating compositions provide coatings with low gloss levels that can be adjusted from a gloss level of less than 1 to 40 or less, when measured at an angle of 60°, by varying the ratios of the high Acid Value and low Acid Value polyester resins in the composition.

13 Claims, 1 Drawing Sheet

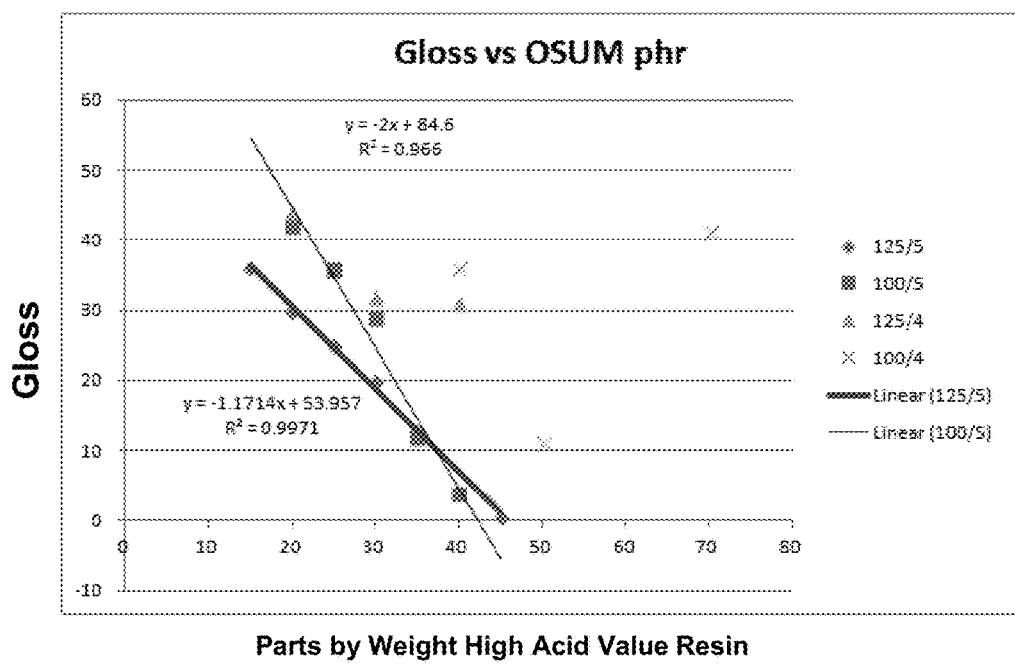

ADJUSTABLE LOW GLOSS POWDER COATING COMPOSITIONS

RELATED APPLICATIONS

This application claims priority to PCT Patent Application No. PCT/US2016/026671, having an International filing date of Apr. 8, 2016, which claims priority to U.S. Provisional Patent Application No. 62/145,686, having a filing date of Apr. 10, 2015, all of which are incorporated herein by reference in their entirety.

FIELD OF THE INVENTION

The present technology relates to polyester resins having a functionality of at least 4.5 for use in thermosetting powder coating compositions. The present technology also relates to the use of such powder coating compositions to prepare low gloss paint compositions that can provide an adjustable level of gloss.

BACKGROUND OF THE INVENTION

Powdered thermosetting compositions are widely used in paints and varnishes for coating a wide variety of articles and surfaces. Typically, such compositions provide coatings having a high gloss after curing.

More recently there has been an interest in powdered thermosetting compositions that can provide a matte or low gloss finish. Matte finishes serve a variety of aesthetic purposes including minimizing reflected light, masking substrate defects, and reducing the visibility of dirt. Matte finishes are particularly desirable for military equipment, since a dull matte finish can reduce detection, and for the automobile industry, since matte coatings hide interior trim parts while providing an attractive contrast to high gloss body paint.

Matte powder coatings based on polyurethane chemistry are known in the art. Such coatings employ one or more polyester resins, and a blocked isocyanate as a cross-linking agent. Although low gloss coatings having acceptable mechanical and hardness properties can be obtained from polyurethane-based powder coating compositions, such compositions are considered harder to work with in application lines.

Other matte thermosetting powder compositions are prepared from one or more polyester resin binders combined with either a triglycidyl isocyanurate (TGIC) cross-linking agent, or a β-hydroxyalkyl amide (HAA) cross-linking agent, together with other optional additives. However, outside the U.S., TGIC is considered toxic, and products made using the material must be labeled. Compositions prepared with HAA as the cross-linking agent do not always provide a repeatable, adjustable matte coating with a single set of resins. For example, different combinations of different polyester resins must be used in order to obtain different levels of gloss.

There still remains a need for thermosetting powder compositions that can consistently produce low gloss or matte coatings having good physical properties. There is also a need for thermosetting powder compositions that employ a set of resins that can provide a broad range of gloss levels that are adjustable within a range of less than 1 to about 40 units.

SUMMARY OF THE INVENTION

In one aspect, the present technology provides a carboxylic-acid functional polyester resin comprising the reaction product of: (1) a polyester polyol obtained from: (a) 0 mol % to 100 mol % of isophthalic acid and/or 0 mol % to 100 mol % terephthalic acid, reacted with (b) a polyol mixture comprising at least one diol and at least one polyol having at least three hydroxyl groups, wherein the polyester polyol has an OH value of about 60 to about 90, an Acid Value of about 3 to about 20 mg KOH/g, and a functionality of about 2.2 to about 3.5, alternatively 2.3 to 2.7; reacted with (2) at least one polycarboxylic acid having at least three carboxylic acid groups and/or its anhydride, wherein the carboxylic acid functional polyester resin has an Acid Value of at least 100 mg KOH/g and a functionality of at least 4.5, alternatively at least 4.7.

In a further aspect, the present technology relates to a low gloss thermosetting powder coating composition comprising from 50% to 100% by weight of a binder composition, wherein the binder composition comprises: (A) at least one carboxylic acid-functional polyester resin having an Acid Value of at least 100 mg KOH/g and a functionality of at least 4.5, wherein the carboxylic acid-functional polyester resin is the reaction product of (1) a polyester polyol obtained from (a) 0 mol % to 100 mol % of isophthalic acid and/or 0 mol % to 100 mol % terephthalic acid reacted with (b) a polyol mixture comprising at least one diol and at least one polyol having at least three hydroxyl groups, the polyester polyol having an OH value of about 60 to about 90, an Acid Value of about 3 to about 20 mg KOH/g, and a functionality of about 2.2 to about 3.5; and (2) at least one polycarboxylic acid having at least three carboxylic acid groups and/or its anhydride; (B) at least one carboxylic acid-functional polyester resin having an Acid Value of about 20 to about 50 mg KOH/g and a functionality of less than about 2.5; and (C) at least one cross-linking agent having functional groups that can react with the carboxylic acid groups of the polyester resins A and B; and from 0% to 50% by weight of one or more additives.

In another aspect, the present technology provides low gloss thermosetting powdered coating compositions that can provide coatings with low gloss levels that can be adjusted from a gloss level of less than 1 to 40 or less, when measured at an angle of 60°, by varying the ratios of the high Acid Value and low Acid Value polyester resins in the composition.

Additional features and advantages will be set forth in the detailed description which follows, and in part will be readily apparent to those skilled in the art from that description or recognized by practicing the embodiments as described herein, including the detailed description which follows, and the claims.

It is to be understood that both the foregoing general description and the following detailed description are merely exemplary, and are intended to provide an overview or framework to understanding the nature and character of the claims.

BRIEF DESCRIPTION OF THE DRAWINGS

FIG. 1 is a graph comparing the gloss levels resulting from powder coatings (One Shot Ultra Matte (OSUM)) made with different amounts of high Acid Value polyester resins having different high Acid Values.

DETAILED DESCRIPTION

The presently described technology provides a powder coating composition that provides a low gloss or matte coating. As used herein, "low gloss" or "matte" coating means a surface coating that has a level of gloss, measured at an angle of 60°, of about 40 units or less. The powder coating composition comprises a polyester resin having an Acid Value of 100 or greater and a functionality of at least 4.5 (high Acid Value resin), and a polyester resin having a low Acid Value (preferably about 33 or less) and a low functionality (less than about 2.5) (low Acid Value resin).

The polyester resins used in the powder coating composition advantageously provide a level of gloss that can be adjusted to a level of about 1 to about 40 units by changing the ratio of the high Acid Value and low Acid Value polyester resins in the composition.

High Acid Value Polyester Resin

The high Acid Value polyester resin is a particular branched carboxylic acid functional polyester resin having an Acid Value of at least 100 mg KOH/g, preferably at least 125 mg KOH/g, and a functionality of at least 4.5, alternatively at least 4.7, and less than about 5.5. The components and relative amounts thereof used to prepare the high Acid Value polyester resin are selected such that the resulting high Acid Value polyester resin can advantageously be mixed with any of a number of known low Acid Value polyester resins to produce a powder coating composition that delivers a low gloss, yet smooth, flexible, and chemically resistant finish.

The high Acid Value polyester resin is prepared by reacting at least one carboxylic acid component with at least one polyol component to form a polyester polyol. The amount of the carboxylic acid component and the amount of the polyol component relative to each other are selected such that the formed polyester polyol has an OH value in the range of about 60 to about 90 mg KOH/g, an Acid Value in the range of about 3 to about 20 mg KOH/g, and a functionality in the range of about 2.2 to about 3.5. The polyester polyol is then reacted with at least one polycarboxylic acid or its anhydride in amounts selected to achieve a high Acid Value polyester resin having a functionality of at least 4.5, preferably at least 4.7, and an Acid Value of at least 100 mg KOH/g. In some embodiments, the Acid Value of the high Acid Value polyester resin is at least 110, alternatively at least 120, alternatively at least 125 mg KOH/g.

The carboxylic acid component comprises from 0 mol % to 100 mol % of isophthalic acid, and/or from 0 mol % to 100 mol % of terephthalic acid. Excellent weathering properties are achieved when the carboxylic acid component consists entirely (100 mol %) of isophthalic acid. The carboxylic acid component can also consist of terephthalic acid, if weathering is not a concern for the coating, or can comprise blends of isophthalic and terephthalic acid. The carboxylic acid component can also comprise up to about 25 mol % of dicarboxylic acids other than isophthalic acid and terephthalic acid. Such other dicarboxylic acids include malonic acid, succinic acid, glutaric acid, adipic acid, pimelic acid, suberic acid, maleic acid, fumaric acid, 1,3-cyclohexanedicarboxylic acid, 1,4-cyclohexanedicarboxylic acid, phthalic acid, and mixtures thereof. For example, in one contemplated embodiment, the carboxylic acid component comprises about 17 mol % of adipic acid in combination with isophthalic and/or terephthalic acid. These other dicarboxylic acids, if used, can be in the free acid form, or alternatively, in the form of the corresponding anhydride or as an ester formed with a short chain (C2 to C4) aliphatic alcohol.

The polyol component that is reacted with the carboxylic acid component comprises a mixture comprising at least one diol and at least one polyol having at least three hydroxyl groups. The molar ratio or level of diol to triol is selected so that the resulting polyester polyol component has a hydroxyl functionality of about 2.2 to about 3.5, preferably about 2.4 to about 2.7, preferably about 2.5. Suitable diols include diethylene glycol, neopentyl glycol, 1,2-propanediol, 1,3-propanediol, 1,4-butanediol, 1,6-hexanediol, 2-methyl-1,3-propandiol, 1,4-cyclohexanediol, 2-ethyl-1,3-propanediol, 2-methyl-2,4-pentandiol, 2-butyl-2-ethyl-1,3-propandiol, 2-ethyl-1,3-hexanediol, and mixtures thereof. Preferably, the at least one diol is not ethylene glycol. Suitable polyols having at least three hydroxyl groups include trimethylolpropane, glycerol, ditrimethylolpropane, pentaerythritol, trimethylolethane, and mixtures thereof. Trimethylol propane is particularly suitable. Also suitable are mixtures of trimethylolpropane and glycerol, particularly in equimolar amounts.

The polyester polyol made by reacting the carboxylic acid component and the polyol component is then reacted with a polycarboxylic acid or an anhydride thereof to make the high Acid Value polyester resin. Polycarboxylic acids are those that have at least three carboxylic acid groups. Suitable polycarboxylic acids and/or anhydrides for use herein include trimellitic acid, pyromellitic acid, trimellitic anhydride, pyromellitic anhydride, and mixtures thereof. Trimellitic anhydride is a particularly suitable polycarboxylic acid component.

A sufficient amount of the polycarboxylic acid is reacted with the polyester polyol to obtain a branched carboxylic acid functional polyester resin having an Acid Value of at least 100 mg KOH/g, alternatively, at least 120, alternatively at least 125 mg KOH/g, and a functionality of at least 4.5. The sufficient amount is determined on a molar ratio basis, and will depend, at least in part, on the OH value of the polyester polyol. When trimellitic anhydride is used as the polycarboxylic acid, the amount used is determined based on the assumption that only the anhydride group reacts with the polyester polyol. The amount of trimellitic anhydride (TMA) is selected/calculated such that the molar ratio of TMA to polyol hydroxyl is 0.90 to 0.99 and preferably 0.95. At lower levels of TMA (higher residue OH value) there is a danger of further esterification reactions that will increase molecular weight and viscosity, leading to decreased flow and appearance. In the worst case enough esterification could result in gelation in the reactor. Higher levels of TMA could/will result in unreacted (free) TMA in the final product, which is a health concern. The 0.95 level is sufficient to ensure complete reaction with a relatively low residue OH value (3-7) so that further esterification is unlikely.

The high Acid Value polyester resin is prepared in a two-step process using conventional esterification process steps. In the first stage, the carboxylic acid component is reacted with the polyol component at a reaction temperature in the range of 160° C. to 225° C., in the presence of a standard esterification catalyst, such as dibutyltin oxide until a polyester polyol is formed having an OH value in the range of about 60 to about 90 mg KOH/g, an Acid Value of about 3 to about 20 mg KOH/g, alternatively about 3 to about 8 mg KOH/g, and a functionality of about 2.2 to about 3.5, alternatively about 2.3 to about 2.7.

The polyester polyol is allowed to cool to a temperature in the range of about 170° C. to about 200° C., and, in a second stage, the polycarboxylic acid and/or anhydride mixture thereof is reacted with the polyester polyol in an amount sufficient to obtain a carboxylic acid functional polyester resin having an Acid Value of greater than 100 mg KOH/g, and a functionality of at least 4.5.

One advantage of the presently described high Acid Value polyester resins is that they can be combined with a wide variety of low Acid Value polyester resins, and a suitable cross-linking agent, to obtain low gloss powder coating compositions that have gloss levels that are adjustable from a level of about 1 to about 40 by varying the ratio of the high Acid Value and low Acid Value resins.

Low Acid Value Polyester Resin

The low Acid Value resin polyester resin is a carboxyl-terminated polyester resin that is the reaction product of a carboxylic acid or anhydride component with at least one hydroxyl-functional compound. The carboxylic acid or anhydride component can be a mixture of carboxylic acids and/or anhydrides. Suitable carboxylic acids include aromatic carboxylic-acid based material, such as, for example, isophthalic acid, terephthalic acid, tertiary butyl isophthalic acid, phthalic anhydride, dimethyl terephthalate, dimethyl phthalate, dimethyl isophthalate, polyethylene terephthalate, benzoic acid, methyl benzoate, methyl toluate, toluic acid, 2,5-furandicarboxylic acid, trimellitic anhydride, methyl terephthalate, and mixtures thereof. Suitable acids also include aliphatic carboxylic acid-based material which can be any monofunctional, difunctional, or trifunctional carboxylic acid. These include, but are not limited to, fatty acids, monocarboxylic acids of 1-30 carbons, adipic acid, fumaric acid, glutaric acid, maleic acid, succinic acid, and their corresponding anhydrides, citric acid, trimethylolpropionic acid, dimer acids and trimer acids of fatty acid origin, or mixtures thereof. If used, monofunctional carboxylic acids are combined with higher functional carboxylic acids so that the average functionality of the carboxylic acid component is greater than 1.0 and preferably at least 1.6.

Suitable hydroxy-functional compounds for preparing the low Acid Value polyester resin include diols or polyols. Specific examples of such compounds include 1,2-propanediol, 1,3-propanediol, dipropylene glycol, tripropylene glycol, ethylene glycol, diethylene glycol, dihydroxylmethylcyclohexane, 2-ethyl-1,3-hexanediol, 2,4-diethyl-1,5-pentanediol, 2-butyl-2-ethyl-1,3-propanediol, 3-methyl-1,5-pentanediol (MPD), glycols containing from 2 to 30 carbon atoms per molecule, glycerol, polyethylene glycol, polypropylene glycol, trimethylolpropane, pentaerythritol, neopentyl glycol (NPG), butylene glycols, 1,2-cyclohexanediol, hexane diols, pentane diols, poly oxyalkylene diols (e.g.—tri and tetra ethylene glycol), and mixtures thereof.

The low Acid Value polyester resin can also include one or more natural oils, for example, triglycerides (especially fats and oils)) derived from renewable resources. The natural oils may be unmodified (e.g., do not contain a hydroxyl functional group), functionalized natural oil polyols, or a combination thereof. Suitable natural oils include, for example, triglyceride oils, coconut oil, cochin oil, corn oil, cottonseed oil, linseed oil, olive oil, palm oil, palm kernel oil, peanut oil, soybean oil, sunflower oil, tall oils, tallow, lesquerella oil, tung oil, whale oil, tea seed oil, sesame seed oil, safflower oil, rapeseed oil, fish oils, derivatives thereof, and combinations thereof. Suitable derivatives of natural oils include, but are not limited to, carboxylic acids (e.g., fatty acids), lower alkanol esters (e.g., fatty acid methyl esters), and fatty acid alkanolamides. Examples of fatty acids include, but are not limited to, caproic, caprylic, capric, lauric, myristic, palmitic, stearic, oleic, linoleic, linolenic, ricinoleic, and mixtures thereof. Another suitable acid is 2-ethylhexanoic acid. Examples of fatty acid methyl esters include, but are not limited to, methyl caproate, methyl caprylate, methyl caprate, methyl laurate, methyl myristate, methyl palmitate, methyl oleate, methyl stearate, methyl linoleate, methyl linolenate, and mixtures thereof. Examples of fatty alkanolamides include, but are not limited to, tall oil fatty acid diethanolamide, lauric acid diethanolamide, and oleic acid monoethanolamide. These suitable natural oils can be functionalized by expoxidizing and/or hydroxylating reactions.

The low Acid Value polyester resin can be made in a single step process by reacting the carboxylic acid component in an amount of 30 to 70 percent by weight based on the total weight of the reactants, with the hydroxyl-functional compound or compounds, in an amount of 70 to 30 percent by weight based on the total weight of the reactants. The reactants are heated to a temperature of about 220° C. in the presence of a catalyst, such as dibutyltin oxide, and are allowed to react until an Acid Value of about 20 to about 50 mg KOH/g is reached. The resulting carboxyl terminated polyester resin has a functionality of about 2.5 or less, and an Acid Value in the range of about 20 to about 50 mg KOH/g. Particularly suitable functionalities are in the range of 1.9 to about 2.2. Particularly suitable Acid Values are in the range of about 30 to about 40 mg KOH/g. The polyester resin has a Tg of at least 40° C., and preferably in the range of 50° C. to 70° C.

The polyester resin may also be made in a two step process as known in the art, particularly if terephthalic acid is used as an aromatic diacid.

Cross-Linking Agent

Cross-linking agents suitable for use with the high Acid Value and low Acid Value polyester resins are those that have functional groups reactive with the carboxylic acid groups of the polyester resins. Compounds of this type include epoxy-functional compounds, such as polyepoxide compounds, and β-hydroxyalkylamides. β-hydroxyalkylamides are preferred cross-linking agents since they are less toxic or hazardous than polyepoxide cross-linking agents. Suitable epoxy compounds for use herein have an epoxy functional level of at least 1.7, and include triglycidyl isocyanurate (TGIC), triglycidyl trimellitate, diglycidyl terephthalate, diglycidyl isophthalate, and mixtures thereof. The amount of the epoxy cross-linking agent will depend on the acid number of the polyester resins and the epoxy functional level of the epoxy cross-linking agent. In general, the epoxy cross-linking agent is provided in an amount that provides from about 0.8 to about 1.3, alternatively from about 0.9 to about 1.1 epoxy groups per equivalent carboxyl groups in the carboxyl-terminated polyester resins.

Suitable β-hydroxyalkylamides (HAA) for use herein contain at least one and preferably 2 or more bis(3-hydroxyalkyl)amide groups. Such cross-linking agents are commercially available under the name PRIMID, EMS-Chemie Ag. The amount of the HAA cross-linking agent will depend on the acid number of the polyester resins and the number of amide groups in the HAA cross-linking agent. In general, for maximum chemical resistance an equivalent ratio of HAA groups to acid groups of 0.95 to 1.05 is preferred with 1.0 being considered ideal. In some applications it may be advantageous to have a lower molar ratio of about 0.75 to about 0.95 HAA to acid groups (i.e. excess acid) to increase flow and to improve coating smoothness, reduce gloss even further, and to expand the range of adjustability (i.e. decrease the rate at which gloss changes as a function of the resin ratio), without much apparent effect on other coating properties. A molar ratio of less than about 0.75, however, will noticeably affect chemical resistance and other coating properties that depend on a full cure, while a molar ratio greater than about 1.05 (i.e. excess HAA) will increase costs without providing any additional benefit.

Low Gloss Powder Coating Compositions

The low gloss powder coating compositions of the present technology comprise, as a binder, (a) the high Acid Value polyester resin, (b) the low Acid Value polyester resin, and (c) the cross-linking agent. Optionally, one or more additives conventionally used in powder coating applications to improve the performance or properties of the powder coating composition, or the resulting coating, can be added to the binder composition. One of skill in the art is familiar with such additives, which can include, for example, flow control agents, fillers, pigments, or combinations thereof. The polyester resins and cross-linking agent together comprise from about 50% to 100% by weight of the total weight of the low gloss powder coating composition, and the total amount of additives comprises from 0 to 50 percent by weight of the total weight of the low gloss powder coating composition.

The type and amount of additives included in the low gloss powder coating composition depend upon the desired properties and end use for the powder coating composition. One of skill in the art would understand from the base formula and the end use for the composition what types and amounts of additives could be used. For example, flow control agents are employed in amounts which provide the low gloss powder coating with the desired surface aesthetics, anti-cratering and pin-hole free surface, smoothness, adhesion, and dry flow. These agents are added in amounts ranging from 0.1 to 15.0 percent by weight based on the total weight of the low gloss powder coating composition. Suitable flow control agents include, for example, polyacrylate oligomers, silicones, Teflon, benzoin, polytetrafluoroethylene (PTFE), organic polymers, or combinations thereof.

Fillers are incorporated in amounts which provide the low gloss powder coating composition with desired cost, hardness, volume, surface texture, and corrosion resistance. Typical amounts of fillers are in the range of 0 to about 50 percent by weight based on the total weight of the low gloss powder coating composition. Suitable fillers include, for example, calcium carbonate, barium sulfate, kaolin clay, ground pumice, nanoparticles, or combinations thereof.

Pigments are added to provide desired color and opacity to the low gloss powder coating composition. Suitable pigments include, for example, carbon black, titanium dioxide, iron oxide, mixed metal oxide, phthalocyanine blue, phthalocyanine green, chromium oxide, organic pigments, or combinations thereof. Typical amounts of pigments are in the range of 0 to about 50 percent by weight based on the total weight of the low gloss powder coating composition.

The low gloss powder coating compositions are prepared by techniques known in the art. One technique is a "two shot" process, wherein two different resins are each separately mixed and extruded. The extruded resins are then blended together and ground into the powder coating composition. Preferably, the powder coating compositions of the present technology are prepared by a "one shot" process. In this alternative, the high Acid Value polyester resin, the low Acid Value polyester resin, the cross-linking agent, and any additives are dry blended to form a homogeneous blend. The blend is then introduced into an extruder, where it is thoroughly mixed, melted, and extruded into an extrudate. Typical extruder temperatures are in the range of about 90° C. to about 110° C. The extrudate is allowed to cool, then ground and sieved to obtain a powder having a suitable particle size. Useful particle sizes can range from a median particle size of about 25 microns to about 150 microns. An optimal median particle size is in the range of about 30 microns to about 70 microns. The "one shot" process is advantageous because it eliminates the separate mixing and extruding steps that are necessary in the "two shot" process. In addition, the powder coatings of the present technology, prepared by the "one shot" method, can be reprocessed, something that cannot be done when a "two shot" process is used.

The resulting low gloss powder coating composition can be applied to articles or substrates using various techniques, such as, for example, electrostatic spraying or fluidized bed coating applications. Once the powder coating has been applied to the article or substrate, it is heated in an oven to cause the powder particles to melt and flow together. Continued heating results in a cured coating on the article or substrate.

An important aspect of the present technology is that the gloss levels of the resulting coating can be adjusted from less than 1 to about 40 by changing the weight ratios of the high Acid Value polyester resin to the low Acid Value polyester resin. In some embodiments, gloss levels of less than 1 can be achieved when the weight ratio of high Acid Value resin to low Acid Value resin is 45/55. Decreasing the amount of high Acid Value resin to low Acid Value resin to a weight ratio of 15/85 increases the gloss level to about 40.

A further aspect of at least some embodiments of the powder coating composition is that the resulting coating can be recoated. This is not always true for coatings made from prior art powder coating compositions, especially when waxes are used to provide lower gloss levels.

EXAMPLES

The following examples describe some of the preferred embodiments of the present technology without limiting the technology thereto. Table A provides trade names and descriptions of various components used in the following examples.

TABLE A

| Trade Names and Abbreviations | |
| --- | --- |
| RUCOTE ® XP-9014 | Carboxyl-functional polyester resin having an Acid Value of 32-36 mg KOH/g, available from Stepan Company, Northfield, Illinois |
| PRIMID ® XL-552 | β-hydroxyalkylamide cross-linking agent, available from EMS-Chemie, Ag. |

The following test methods and instruments are used to evaluate the panels produced in the examples:

Surface Gloss

Surface gloss of the coated panels is measured in accordance with ASTM D523, using a BYK micro-TRI-gloss meter, available from BYK-Gardner USA, Columbia, Md.

Gardner Forward and Reverse Impact

Gardner forward and reverse impact is measured in accordance with ASTM D2794 using a Gardner Impact Tester.

Adhesion

Coating adhesion is measured in accordance with ASTM D3359, using a Gardner Model P-A-T (Paint Adhesion Test Kit)

Gel Time

Determination of the gel time of the powder coating is in accordance with Powder Coating Institute (PCI) #6 Gel Time Reactivity using a hot plate at 200° C.

Glass Transition Temp (Tg),

Glass transition temperature (Tg) is measured using a Perkin Elmer DSC Model 6 with a 10 mg sample and a heating rate of 20° C./minute. Samples are heated from 30° C. to 110° C. and then cooled quickly to 30° C. to remove crystallization effects, and then reheated to 110° C. The Tg is calculated from the second heat up temperature versus heat capacity curve by taking the first derivative, smoothing, and finding the temperature of the first peak minimum.

Smoothness, Visual Evaluation, PCI Smoothness Panels

The smoothness of the cured coating is determined using visual standards developed by the Powder Coating Institute (PCI). To determine relative smoothness, a powder coated sample is visually compared to ten powder-coated standards graded from 1 (high roughness/orange peel) to 10 (very smooth, high gloss finish). A smoothness grade is assigned to the sample based upon which standard panel is closest to the sample.

Flexibility

Coating flexibility and resistance to cracking is determined by the mandrel bend test method in accordance with ASTM D522.

Solvent Resistance

Surface gloss solvent resistance is measured in accordance with ASTM D4752 using methyl ethyl ketone (MEK) and 100 double rubs.

Example 1: Preparation of High Acid Value Resin

One embodiment of a High Acid Value resin in accordance with the present technology was prepared using the components and amounts in grams recited in Table 1.

TABLE 1

| Reactant | Weight |
| --- | --- |
| Neopentyl Glycol (NPG) | 800 |
| Diethylene Glycol (DEG) | 1000 |
| Trimethylolpropane (TMP) | 165 |
| Isophthalic Acid (IPA) | 2715 |
| Dibutyltin oxide (DBTO) | 5 |
| Trimellitic Anhydride (TMA) | 1077 |

NPG, DEG, TMP, IPA, and DBTO were charged to a 5 L stainless steel round bottom flask equipped with a 12-inch packed column, thermocouple and temperature controller, stirrer and nitrogen inlet and heated to 160° C.

This mixture was heated 5° C./hour from 160° C. to 225° C. and then held at 225° C. for 4 hours before replacing the packed column with a straight column and applying a vacuum of 8" that was gradually increased to about 27" of mercury over 5 hours. The resin was cooled to 196° C. before adding TMA (1077 g) and reacting for a further 3 hours at 196° C. before discharging to a aluminum turkey pan. The resin was allowed to cool overnight prior to chipping.

Example 2: Preparation of a Low Gloss Powder Coating

Powder paints were prepared by first mixing the ingredients in Table 2, using the amounts shown in Table 3, in a plastic bag to a homogeneous blend.

TABLE 2

| Ingredient | Grams |
| --- | --- |
| Polyester resin of Example 1 | Table 3 |
| RUCOTE ® XP 9014 | Table 3 |
| Primid ® XL-552 | Table 3 |
| Flow Control Agent (polyacrylate) | 10 |
| Benzoin | 10 |

TABLE 2-continued

| Ingredient | Grams |
| --- | --- |
| Barium Sulfate | 370 |
| Carbon Black | 10 |

TABLE 3

| Ratio: Low/High | Component 60° Gloss | High AN Example 1 Resin | Low AN RUCOTE XP-9014 | Primid XL-552 |
| --- | --- | --- | --- | --- |
| 0/100 | 29 | 504 | 0 | 96 |
| 50/50 | 1.2 | 255 | 285 | 60 |
| 55/45 | 0.6 | 229.5 | 313.5 | 57 |
| 65/35 | 13 | 178.5 | 370.5 | 51 |
| 70/30 | 20 | 151 | 399 | 50 |
| 75/25 | 25 | 126 | 427.5 | 46.5 |
| 80/20 | 30 | 101 | 456 | 43 |
| 85/15 | 36 | 76 | 484.5 | 39.5 |

After mixing, the dry mixed formulation was then extruded in a Prism TSE 24PC twin screw extruder (equipped with co-rotating 24 mm diameter screws operated at 425 rpm) with Zone 1 at 90° C. and Zone 2 at 110° C. The dry blend was introduced into the extruder by a Brabender Technology adjustable speed feeder. The speed was adjusted to obtain a torque of 60-70 N/m. The extrudate was passed through the Prism Chill Rolls, cooled and broken into chips. The extrudate chips were finely ground in a Cuisinart Spice and Nut Grinder and sieved through a Number 140 (106 μm) standard test sieve. The powder was applied via electrostatic spray with a Nordson SureCoat Manual Gun Unit (set at 95 kV and 30 μA) onto 4"×6"×0.032" cold rolled steel panels (Q-Panel Stock #R-46-I, Bonderite 1000 iron phosphate, P60 Cr, DI Rinse). The coated panels were placed into a Precision Scientific (model 625) electric convection oven and baked for 15 minutes at 400° F. After removal from the oven, the panels were evaluated for surface gloss, Gardner forward and reverse impact, adhesion, gel time, glass transition temperature, smoothness, flexibility, and solvent resistance. Gloss results for each panel are shown in Table 3. All Panels had excellent impact (160/160) and greater than 100 MEK double rubs.

Example 3: Comparison of High Acid Value Resins Having Different Acid Values and Functionalities High Acid Value polyester resins were made according to the procedure of Example 1 using the same reactants as recited in Table 1, except that the reactant amounts are varied in order to obtain polyester resins having different Acid Values and functionalities. The high Acid Value resins prepared are listed in Table 4

TABLE 4

| Resin | Acid Value/Functionality |
| --- | --- |
| Resin 1 | 125/5 |
| Resin 2 | 100/5 |
| Resin 3 | 125/4 |
| Resin 4 | 100/4 |

Each of the high Acid Value polyester resins were used to prepare One Shot Ultra Matte (OSUM) powder paints according to the procedure of Example 2, using different ratios of the high Acid Value and low Acid Value resins. The powder paints were applied to substrates according to the procedure of Example 2, and the resulting coatings were evaluated for surface gloss in accordance with the ASTM D523 standard. The surface gloss was plotted as a function of the ratio of high Acid Value to low Acid Value resin in the powdered paint. The results are graphically shown in FIG. 1.

From FIG. 1, it can be seen that the coatings made with Resin 1, having an Acid Value of 125 mg KOH/g and a functionality of 5, provide gloss levels that smoothly decrease from 36%, at a ratio of 15/85 (high Acid Value/low Acid Value), to less than 1% (0.6% at a ratio of 45/55). Resin 2, having an Acid Value of 100 mg KOH/g and a functionality of 5, also provided gloss levels that smoothly decreased from about 42%, at a ratio of 20/80 (high Acid Value/low Acid Value), to about 4%, at a ratio of 40/60. However, the angle of the slope (rate of gloss change as a function of mix ratio) for Resin 1 is less than that of Resin 2. The lower slope angle is important because it shows that small changes in the mix ratio do not have a big effect on gloss change, making it much easier to get repeatable results with Resin 1, even if small changes in the mix ratio occur.

Resins 3 and 4, having Acid Values that correspond to Resins 1 and 2, respectively, but having functionalities of 4, did not demonstrate any linearity in gloss levels as a function of mix ratio. Comparing Resins 1 and 2 with Resins 3 and 4 shows that having a functionality of 5 for the high Acid Value resin can be important for providing predictable levels of gloss.

Example 4: Preparation of High Acid Value Resin

Another embodiment of a high Acid Value Resin in accordance with the present technology was prepared using the components and amounts in grams recited in Table 5.

TABLE 5

| Reactant | Weight |
| --- | --- |
| Neopentyl Glycol (NPG) | 1980 |
| Adipic Acid (AA) | 495 |
| Trimethylolpropane (TMP) | 222 |
| Isophthalic Acid (IPA) | 2374 |
| Dibutyltin oxide (DBTO) | 2.2 |
| Second Stage | |
| Weston 619 (phosphite based color and molecular weight stabilizer) | 6.6 |
| Trimellitic Anhydride (TMA) | 1133 |

The first stage components (NPG, AA, TMP, IPA, and DBTO) were charged to a 5 L stainless steel round bottom flask equipped with a 12-inch packed column, thermocouple and temperature controller, stirrer and nitrogen inlet and heated to 160° C.

This mixture was heated 5° C./hour from 160 to 225° C. (atmospheric) and then held at 225° C. for 3 under a very light vacuum (ca. 600 mm). The resin was cooled to 180° C. before adding the Weston 619, and TMA and reacting for a further 4 hours at 180° C. before discharging to an aluminum turkey pan. The resin was allowed to cool overnight prior to chipping.

The final resin had an acid value of 117.6 (mg KOH/g), a hydroxyl value of 3.8, a viscosity of 2140 cps at 200° C., and Tg of 62.9. The resin was used to prepare powder paints according to the procedure of Example 2, using different ratios of the Example 4 high Acid Value resin and RUCOTE® XP-9014, a low Acid Value resin, as shown in the following Table 6. The powder paints were applied to substrates according to the procedure of Example 2, and the resulting coatings were evaluated for surface gloss in accordance with the ASTM D523 Standard. The gloss values are reported in Table 6.

TABLE 6

| Weight Ratio: Low/(Low + High) | Component 60° Gloss | High AN Example 4 Resin | Low AN RUCOTE XP-9014 | Primid XL-552 |
| --- | --- | --- | --- | --- |
| 73 | 40 | 151 | 399 | 50 |
| 68 | 37 | 176 | 371 | 53 |
| 63 | 18 | 201.6 | 342 | 56.4 |
| 58 | 8 | 226.8 | 313.5 | 59.7 |
| 53 | 6 | 252 | 285 | 63 |
| 48 | 6 | 277 | 257 | 66 |
| 43 | 7 | 302 | 228 | 70 |
| 38 | 11 | 327.6 | 199.5 | 72.9 |
| 33 | 29 | 352.8 | 171 | 76.2 |

Example 5: Comparison of Formulas Having Different Amounts of Cross-Linking Agent A high Acid Value resin prepared according to Example 4 and Table 5 was used to prepare powder paints according to the procedure of Example 2, using RUCOTE® XP-9014 as the low Acid Value resin, and using different amounts of PRIMID® XL-552 as the cross-linking agent. The components and amounts in grams for each of the formulas for the powder paints are shown in the following Table 7. The powder paints were applied to substrates, and the resulting coatings were evaluated for gloss in accordance with the ASTM D23 standard. Other performance properties were also evaluated. The results are shown in Table 7.

TABLE 7

| Formula | A | B | C |
| --- | --- | --- | --- |
| Table 5 Resin | 252 | 252 | 252 |
| RUCOTE ® XP 9014 | 285 | 285 | 285 |
| Primid ® XL 552 | 63 | 57 | 51 |
| Flow Control Agent (polyacrylate) | 30 | 30 | 30 |
| Barium Sulfate | 360 | 360 | 360 |
| Carbon Black | 10 | 10 | 10 |
| 60° Gloss | 17 | 12 | 6 |
| Impact | 160/160 | 160/160 | 160/160 |
| 100 MEK DR | Excellent | Excellent | Excellent |
| Tg | 57.4 | 57.3 | 57.0 |

A comparison of the results for Formula A and Formula C in Table 7 shows that the amount of cross-linker can be reduced by at least 20% with no adverse effect on the performance properties of the coatings. In addition, the gloss level can be lowered even further using the lower amount of cross-linker. The results show that a cost savings can be achieved by reducing the amount of costly cross-linker, yet still maintain the performance properties, and even achieve a lower gloss.

Example 6: Reprocessable Demonstration

Powder paint was prepared at three different ratios of high and low acid number resin, applied, and tested in accordance with Example 2 using the formulation in the following Table 8.

TABLE 8

| Ingredient | 8A Parts | 8B Parts | 8C Parts |
|---|---|---|---|
| Resin ratio (High Acid/Low Acid) | 35/65 | 40/60 | 45/55 |
| Polyester resin of Example 4 | 178.5 | 204 | 229.5 |
| RUCOTE ® XP 9014 | 370.5 | 342 | 313.5 |
| Primid ® XL-552 | 51 | 54 | 57 |
| Flow Control Agent (polyacrylate) | 20 | 20 | 20 |
| Benzoin | 10 | 10 | 5 |
| Barium Sulfate | 355 | 355 | 355 |
| Carbon Black | 10 | 10 | 10 |

Unused paint was then re-extruded, chipped, ground, and applied to a new panel, then baked and tested as before. This cycle was then repeated a third time so the same batch of formulated powder paint went through the extrude/grind/spray process a total of three times. Test results from the panel evaluations after each cycle are shown in Table 9.

TABLE 9

| | Formulation | | | | | | | | |
|---|---|---|---|---|---|---|---|---|---|
| | 8A | | | 8B | | | 8C | | |
| Passes | 1 | 2 | 3 | 1 | 2 | 3 | 1 | 2 | 3 |
| Gloss 60° | 13 | 10 | 7 | 35 | 35 | 28 | 38 | 39 | 37 |
| Tg | 58.3 | | 58.9 | 58.3 | 56.9 | 59.0 | 56.6 | | 59.4 |
| Impact Direct/Reverse | | | | All 160/160 | | | | | |
| MEK (100 double rubs) | No Effect | No Effect | Slight Marring | No Effect | No Effect | No Effect | No Effect | No Effect | Slight Marring |

As can be seen in Table 9, the coating prepared from the reprocessed powder paint of the present technology was barely affected by being re-extruded. Overspray fines and out of spec powder paints are often re-extruded in order to be recovered or fixed. This is not possible for two-shot systems (two separate paints that are blended together without melting). Accordingly, the powder paints of the present technology can be prepared by the "one shot" process, which allows the powder paints to be reprocessed, thereby resulting in less waste and providing a cost-savings benefit.

Resin A of Table 8 was cured at three different bake cycles. As can be seen in Table 10 the resin is relatively insensitive to bake cycles over a 50 degree Fahrenheit range. This is a desirable feature for a paint, since it means consistent results will be obtained even if cure oven temperature control is less than perfect.

TABLE 10

| Bake | 15' at 375° F. | 15' at 400° F. | 15' at 425° F. |
|---|---|---|---|
| Film Thickness | 2.9 | 2.6 | 2.4 |
| Reverse Impact | 160 | 160 | 160 |
| 100 MEK Double Rubs | No Effect | No Effect | No Effect |
| 60° Gloss | 9 | 11 | 12 |

The present technology is now described in such full, clear, concise, and exact terms as to enable any person skilled in the art to which it pertains, to practice the same. It is to be understood that the foregoing describes preferred embodiments of the invention and that modifications may be made therein without departing from the spirit or scope of the invention as set forth in the appended claims.

The invention claimed is:

1. A low gloss thermosetting powder coating composition that provides an adjustable level of gloss, the composition comprising:
(I) from 50% to 100% by weight of a binder composition, wherein the binder composition comprises:
(A) at least one carboxylic acid-functional polyester resin A having an Acid Value of at least 100 mg KOH/g and a functionality of at least 4.5, wherein the carboxylic acid-functional polyester resin is the reaction product of
(1) a polyester polyol obtained from (a) a carboxylic acid component comprising 0 mol % to 100 mol % of isophthalic acid and/or 0 to 100 mol % terephthalic acid, or a mixture thereof, reacted with (b) a polyol mixture comprising at least one diol and at least one polyol having at least three hydroxyl groups, the polyester polyol having an OH value of about 60 to about 90 MCI KOH/q, an Acid Value of about 3 to about 20 mg KOH/g, and a functionality of about 2.2 to about 3.5; and
(2) at least one polycarboxylic acid having at least three carboxylic acid groups and/or its anhydride;
(B) at least one carboxylic acid-functional polyester resin B having an Acid Value of about 20 to about 50 mg KOH/g and a functionality of less than about 2.5; wherein the amount of polyester resin A in the binder composition is about 15% to about 45% by weight, and the amount of polyester resin B in the binder composition is about 55% to about 85% by weight, based on the total weight of polyester resins A and B; and
(C) at least one cross-linking agent having functional groups that can react with the carboxylic acid groups of the polyester resins A and B; and
(II) from 0% to 50% by weight of one or more additives; wherein changing the amount of polyester resin A relative to the amount of polyester resin B in the binder composition allows the powder coating composition to provide a level of gloss that is adjustable between less than 1 and about 40 units when measured at an angle of 60°.

2. The composition of claim 1, wherein polyester resin A has an Acid Value of greater than 120 mg KOH/g.

3. The composition of claim 1, wherein the polyol having at least three hydroxyl groups is a triol.

4. The composition of claim 3, wherein the triol is selected from trimethylolpropane, trimethylolethane, glycerol, and mixtures thereof.

5. The composition of claim 1, wherein the polycarboxylic acid or anhydride used to make polyester resin A is selected from trimellitic acid, trimellitic anhydride, pyromellitic acid, pyromellitic anhydride, and mixtures thereof.

6. The composition of claim 1, wherein the at least one diol for preparing polyester resin A comprises neopentyl glycol.

7. The composition of claim 6, wherein the at least one diol further comprises at least one other diol.

8. The composition of claim 1, wherein the polyol mixture for preparing polyester resin A does not contain ethylene glycol.

9. The composition of claim 1, wherein the carboxylic acid component further comprises up to 25 mol % of at least one additional dicarboxylic acid.

10. The composition of claim 9, wherein the additional dicarboxylic acid is adipic acid.

11. The composition of claim 1, wherein the cross-linking agent is a p-hydroxyalkylamide group containing compound.

12. The composition of claim 1, wherein the functionality is 4.7 up to 5.5.

13. The composition of claim 1, wherein the polyester polyol used to make polyester resin A has an Acid Value of about 3 to about 8 mg KOH/g.

* * * * *